US012664483B1

(12) United States Patent
Lalithambika et al.

(10) Patent No.: US 12,664,483 B1
(45) Date of Patent: Jun. 23, 2026

(54) SEQUENTIAL FEEDBACK ENSEMBLE MODEL FOR MULTILABEL CLASSIFICATION

(71) Applicant: Humana Inc., Louisville, KY (US)

(72) Inventors: Sreedevi Madhusoodhanan Lalithambika, Lincoln, NE (US); Sandy S. Chiu, Louisville, KY (US)

(73) Assignee: Humana Inc., Louisville, KY (US)

( * ) Notice: Subject to any disclaimer, the term of this patent is extended or adjusted under 35 U.S.C. 154(b) by 1090 days.

(21) Appl. No.: 17/581,096

(22) Filed: Jan. 21, 2022

(51) Int. Cl.
  *G06N 20/20* (2019.01)
  *G06F 40/20* (2020.01)
(52) U.S. Cl.
  CPC ............. *G06N 20/20* (2019.01); *G06F 40/20* (2020.01)
(58) Field of Classification Search
  CPC ................................ G06N 20/20; G06F 40/20
  USPC .......................................................... 706/12
  See application file for complete search history.

(56) References Cited

U.S. PATENT DOCUMENTS

| | | | | |
|---|---|---|---|---|
| 11,694,775 B1 * | 7/2023 | Maier | ...................... | G06N 7/01 |
| | | | | 705/2 |
| 2016/0135706 A1 * | 5/2016 | Sullivan | ............... | A61B 5/7275 |
| | | | | 600/509 |
| 2023/0346241 A1 * | 11/2023 | Puentmann | ............ | G01R 33/50 |

OTHER PUBLICATIONS

Wang, et al., "A comparative assessment of ensemble learning for credit scoring", Expert systems with applications 38 (2011) 223-230, 2011 (Year: 2011).*
Wu, et al., "Ensemble learning models for food safety risk prediction", Sustainability 2021, 13, 12291, 2021 (Year: 2021).*
Yu, et al., "Credit risk assessment with a multistage neural network ensemble learning approach", Expert systems with applications 34 (2008) 1434-1444, 2008 (Year: 2008).*

* cited by examiner

*Primary Examiner* — Tsu-Chang Lee
(74) *Attorney, Agent, or Firm* — Standley Law Group LLP; Jeffrey S. Standley; James L. Kwak

(57) ABSTRACT

A sequential feedback prediction system predicts a risk of an event associated with a set of potential outcomes. The system receives training data including data records that have information associated with risk factors. Each data record may be labeled with outcomes that have inherent sequential dependencies. The system trains sub-models, each sub-model predicting risks for a respective outcome using a set of risk factors. For each sub-model, the system may determine a subset of sub-models whose results are used as input for the sub-model. The system determines an order to run the set of sub-models such that prediction results for preceding sub-models may be used as inputs for subsequent sub-models. The system may determine a number of rounds to run the ordered sequence of sub-models until the performance of the ensemble model meets a predetermined threshold. The system may generate a risk score for each of the set of outcomes.

14 Claims, 6 Drawing Sheets

100

Figure 5:
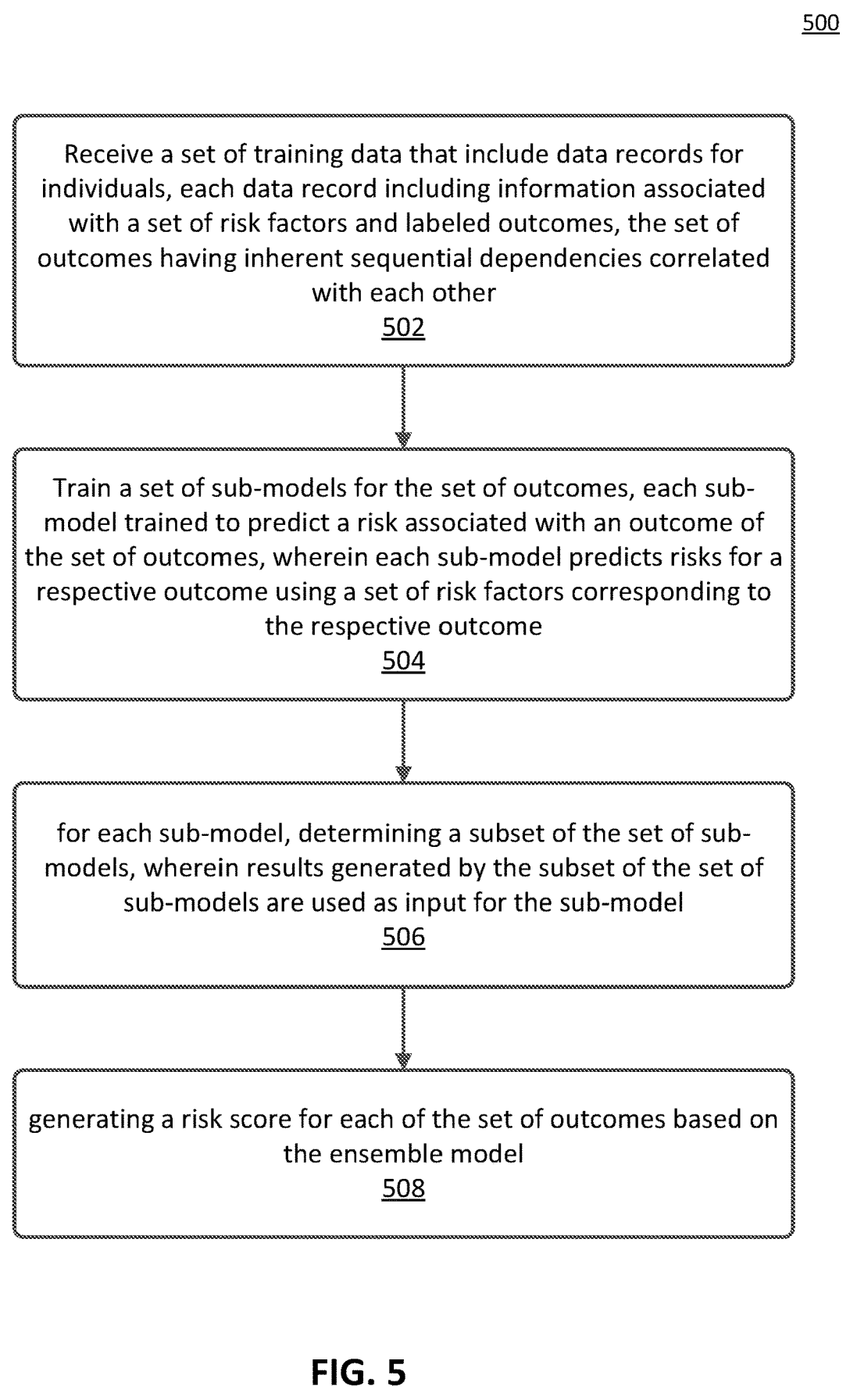

500

Receive a set of training data that include data records for individuals, each data record including information associated with a set of risk factors and labeled outcomes, the set of outcomes having inherent sequential dependencies correlated with each other
502

Train a set of sub-models for the set of outcomes, each sub-model trained to predict a risk associated with an outcome of the set of outcomes, wherein each sub-model predicts risks for a respective outcome using a set of risk factors corresponding to the respective outcome
504 for each sub-model, determining a subset of the set of sub-models, wherein results generated by the subset of the set of sub-models are used as input for the sub-model
506 generating a risk score for each of the set of outcomes based on the ensemble model
508

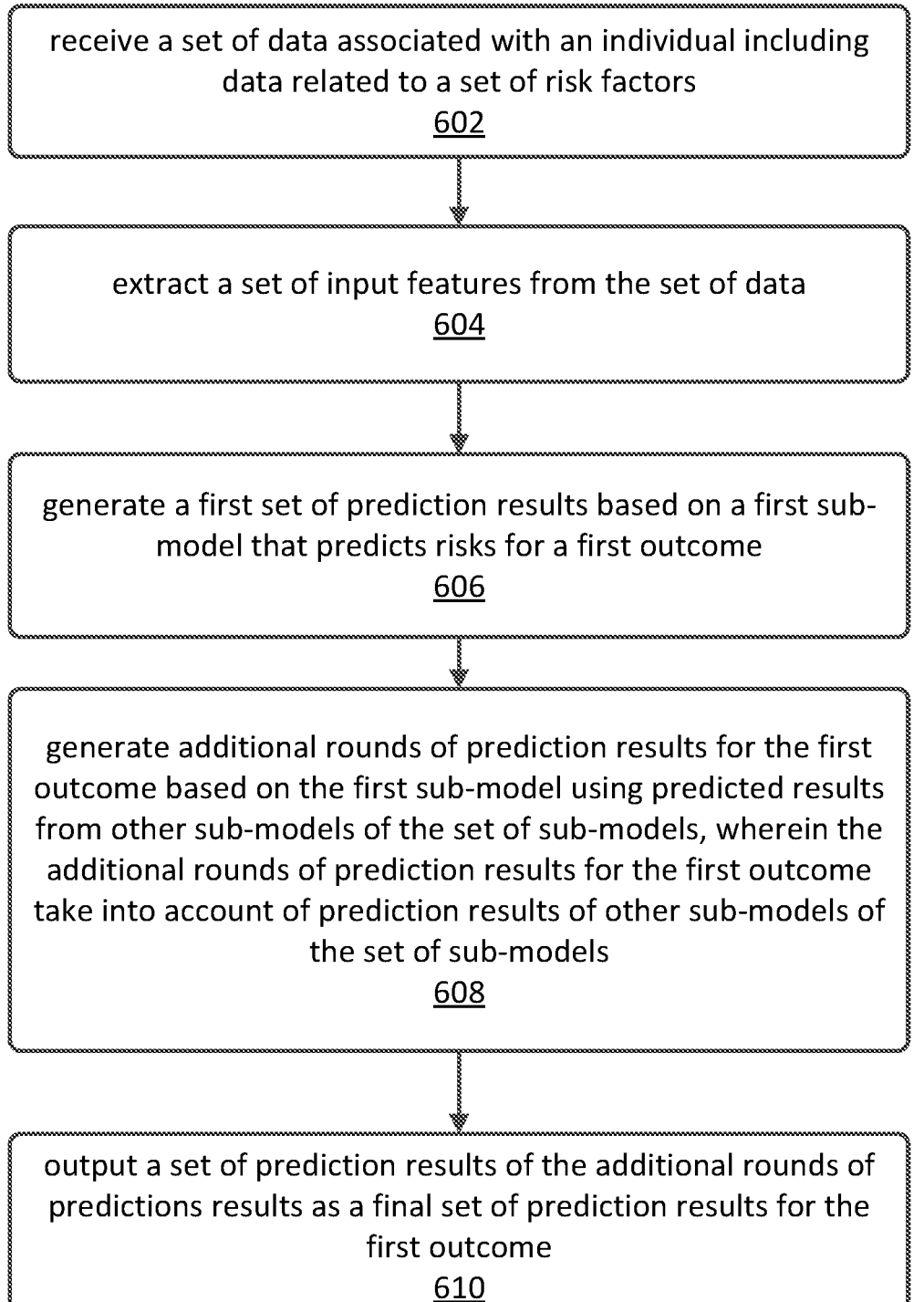

receive a set of data associated with an individual including data related to a set of risk factors
602 extract a set of input features from the set of data
604 generate a first set of prediction results based on a first sub-model that predicts risks for a first outcome
606 generate additional rounds of prediction results for the first outcome based on the first sub-model using predicted results from other sub-models of the set of sub-models, wherein the additional rounds of prediction results for the first outcome take into account of prediction results of other sub-models of the set of sub-models
608 output a set of prediction results of the additional rounds of predictions results as a final set of prediction results for the first outcome
610

FIG. 6

SEQUENTIAL FEEDBACK ENSEMBLE MODEL FOR MULTILABEL CLASSIFICATION

FIELD OF INVENTION

This invention relates generally to making predictions using machine learning models, and more particularly to making predictions using a sequential feedback ensemble model.

BACKGROUND

A predictive model is a commonly used technique for predicting outcomes. The predictive model may use data collected associated with an entity and predict a possibility of an event for the entity (e.g., predicting a probability that a person is associated with a particular event). In some embodiments, a likelihood of an incidence may be associated with multiple potential outcomes that have inherent sequential dependencies. In other words, the occurrence of one outcome may indicate a high likelihood associated with another outcome. Conventional models for predicting such outcomes fail to incorporate information associated with inherent sequential dependencies among sub-models and as a result have poor prediction results, particularly in cases with very low prevalence. Poor quality of prediction results causes further failures in downstream actions taken based on the predictions.

SUMMARY

Systems and methods are disclosed herein for a sequential feedback prediction system that predicts a risk of an event associated with a set of potential outcomes. The sequential feedback prediction system may receive a set of training data. The set of training data includes a plurality of data records for a plurality of individuals. Each data record includes information associated with a set of risk factors (e.g., diabetes, drug abuse, etc.) Each data record may be associated with labeled outcomes for a set of outcomes. The set of outcomes have inherent sequential dependencies correlated with each other. The sequential feedback prediction system may train a set of sub-models for the set of outcomes. Each sub-model corresponds to an outcome of the set of outcomes. Each sub-model predicts risks for a respective outcome using a set of risk factors corresponding to the respective outcome. For each sub-model, the sequential feedback prediction system may determine a subset of sub-models whose results are used as input for the sub-model. The sequential feedback prediction system may determine an order to run the set of sub-models such that prediction results for preceding sub-models may be used as inputs for subsequent sub-models. The sequential feedback prediction system may further determine a number of rounds to run the ordered sequence of sub-models until the performance of the ensemble model meets a predetermined threshold. The sequential feedback prediction system may generate a risk score for each of the set of outcomes based on each sub-model and generate a risk report with based on the risk scores for each of the set of outcome.

The sequential feedback ensemble system may be used in various applications, for example, in the context of manufacturing and retail applications and may be used to forecast demands of multiple parts that might have overlapping uses.

BRIEF DESCRIPTION OF THE DRAWINGS

FIG. 5 illustrates an exemplary training process for a sequential feedback ensemble model, according to one embodiment.

FIG. 6 illustrates an exemplary deployment process using a sequential feedback ensemble model, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
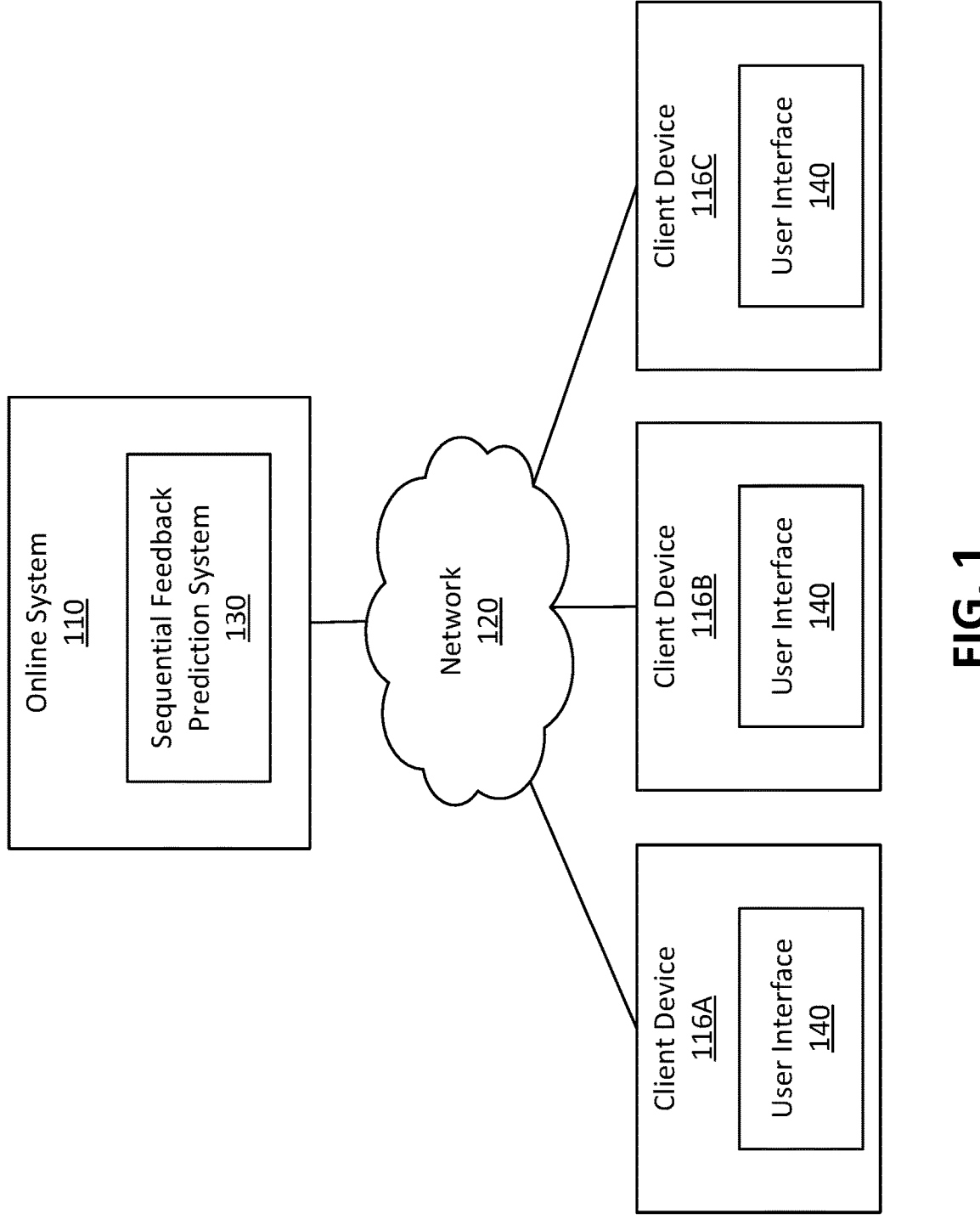
FIG. 1 is an exemplary system environment including a sequential feedback prediction system, according to one embodiment.

FIG. 1 is a high level block diagram of a system environment for a sequential feedback prediction system 130, in accordance with an embodiment. The system environment 100 shown by FIG. 1 includes one or more clients 116, a network 120, and the sequential feedback prediction system 130. In alternative configurations, different and/or additional components may be included in the system environment 100.

The network 120 represents the communication pathways between the client 116 and sequential feedback prediction system 130. In one embodiment, the network 120 is the Internet. The network 120 can also utilize dedicated or private communications links that are not necessarily part of the Internet. In one embodiment, the network 120 uses standard communications technologies and/or protocols. Thus, the network 120 can include links using technologies such as Ethernet, Wi-Fi (802.11), integrated services digital network (ISDN), digital subscriber line (DSL), asynchronous transfer mode (ATM), etc. Similarly, the networking protocols used on the network 120 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 120 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The client 116 may include one or more computing devices that display information to users, communicate user actions, transmit, and receive data from the sequential feedback prediction system 130 through the network 120. While only three clients 116A-C are illustrated in FIG. 1, in practice many clients 116 may communicate with the sequential feedback prediction system 130 in the environment 100. In one embodiment, client 116 may be operated in connection with a service provided by the sequential feedback prediction system 130 for risk analysis. For example, client 116 may be operated by a representative of an organization or an entity that provides service to customers, or any other entity interested in generating meaningful insights through big datasets.

The client 116 may receive services by using software tools or through web pages provided by the sequential feedback prediction system 130 for risk analysis. The tools may be software applications or browser applications that enable interactions between the client 116 and the sequential feedback prediction system 130 via the network 120. The client 116 may access the software tool through a browser or may download the software tool through a third-party application platform, such as an app store. In one embodiment, the client 116 interacts with the network 120 through an application programming interface (API). In one embodiment, the tools may receive inputs from the client 116 which are further used to develop training dataset or to retrain the model. The software tools may include an interface through which the client 116 may provide information or feedback with regard to the prediction results.

The client 116 may include one or more computing devices that are capable of deploying a machine learning model. The client 116 may receive trained machine learning models from the sequential feedback prediction system 130 and perform real-world deployments of the trained machine learning model on a dataset collected based on communications. The deployments of the model may be conducted on one or more devices of the client 116. The model may also be deployed remotely by the sequential feedback prediction system 130 (or a third-party cloud service that is capable of deploying the model), in which case, collected data may be transmitted from client 116 to the sequential feedback prediction system 130 (or the cloud service provider). The sequential feedback prediction system 130 may analyze the collected data and provide outputs back to client 116 (e.g., through a network communication, such as communication over the Internet). Where the model is deployed local to the client, a software package developed and distributed by sequential feedback prediction system 130 may be downloaded to or otherwise transferred to client 116 and may be executed to perform any described post-output analysis.

The client 116 may also include one or more computing devices that are capable of displaying a user interface 140 through the computing devices. The client 116 may access service provided by the sequential feedback prediction system 130. The user interface 140 may enable users to view risk profile and/or risk prediction results. The user interface 140 may also display other information such as user profile, user information, historical data such as medical history, etc.

The sequential feedback prediction system 130 may manage and provide an end-to-end service for training a machine learning model and making predictions for risk analysis. The sequential feedback prediction system 130 may train a machine learning model pipeline that includes multiple sub-models for predicting a probability that a specific outcome will happen. The sequential feedback prediction system may train a set of sub-models each predicting a risk associated with an outcome. The sequential feedback prediction system may then construct an ensemble model using the set of sub-models. This is accomplished by determining an order to run the sub-models and an architecture to assemble the sub-models. In one embodiment, the sequential feedback prediction system may determine to arrange sub-models with more prevalent outcomes, less prevalent outcomes, more precise predictions or high true positive rate in a further front position based on the use case, such that prediction results for the sub-model may be used as inputs for sub-sequent models. The sequential feedback prediction system may further determine a particular architecture for the ensemble model such as determining a number of rounds to run the sequence of sub-models and determining a set of preceding sub-models whose results may be used as inputs for each sub-model, in addition to each sub-model's own input feature vectors. Further details with regard to functionalities provided by the sequential feedback prediction system 130 are illustrated in FIG. 2.

The sequential feedback prediction system provides multiple advantageous technical features for risk predictions. For example, the sequential feedback prediction system may improve prediction results for an outcome by leveraging prediction results of other potential outcomes. As a particular example, high-risk pregnancy may be associated with multiple outcomes such as preterm delivery, Neonatal Abstinence Syndrome (NAS), Neonatal Intensive Care Unit (NICU), or C-section. Each potential outcome may indicate that the patient may be associated with high risk pregnancy. However, the potential outcomes may be interdependent such that the occurrence of one outcome may indicate a high risk associated with another outcome. For example, 49% of patients that have preterm delivery may have NICU. The disclosed sequential feedback prediction system improves prediction performance by constructing a model with a particular sequential architecture that uses prediction results from previous model as input for subsequent sub-models. The disclose methods and systems may determine a specific order for assembling the sub-models such that the ones with more predictive strength are further in the front in the determined order. The system may also determine a number of rounds to run the ordered sequence of sub-models and determines a subset of sub-models whose results are used as input for subsequent models. The system may further improve prediction results by performing an iterative process such that each sub-model may leverage results from other sub-models for a better prediction. Even more, the system provides a comprehensive risk profile leveraging both qualitative and quantitative analysis.

The disclosed sequential feedback ensemble system may be applied in various scenarios for making predictions associated with different outcomes that may be correlated with each other. The specific example used throughout the description may be related to high risk pregnancy and potential outcomes such as preterm delivery, Neonatal Abstinence Syndrome (NAS), Neonatal Intensive Care Unit (NICU), or C-section. The sequential feedback ensemble system may access risk associated with a pregnant woman by predicting risks associated with each outcome. This specific example is for illustration purposes only, whereas the ensemble model may be used to predict a likelihood for an outcome of a set of potential outcomes. The ensemble model may be further used to determine classification based on the predicted likelihood. In one embodiment, the sequential feedback ensemble system may also predict comorbid conditions as well in healthcare (e.g., multiple conditions occurring in a person, where the multiple conditions are correlated).

Figure 2:
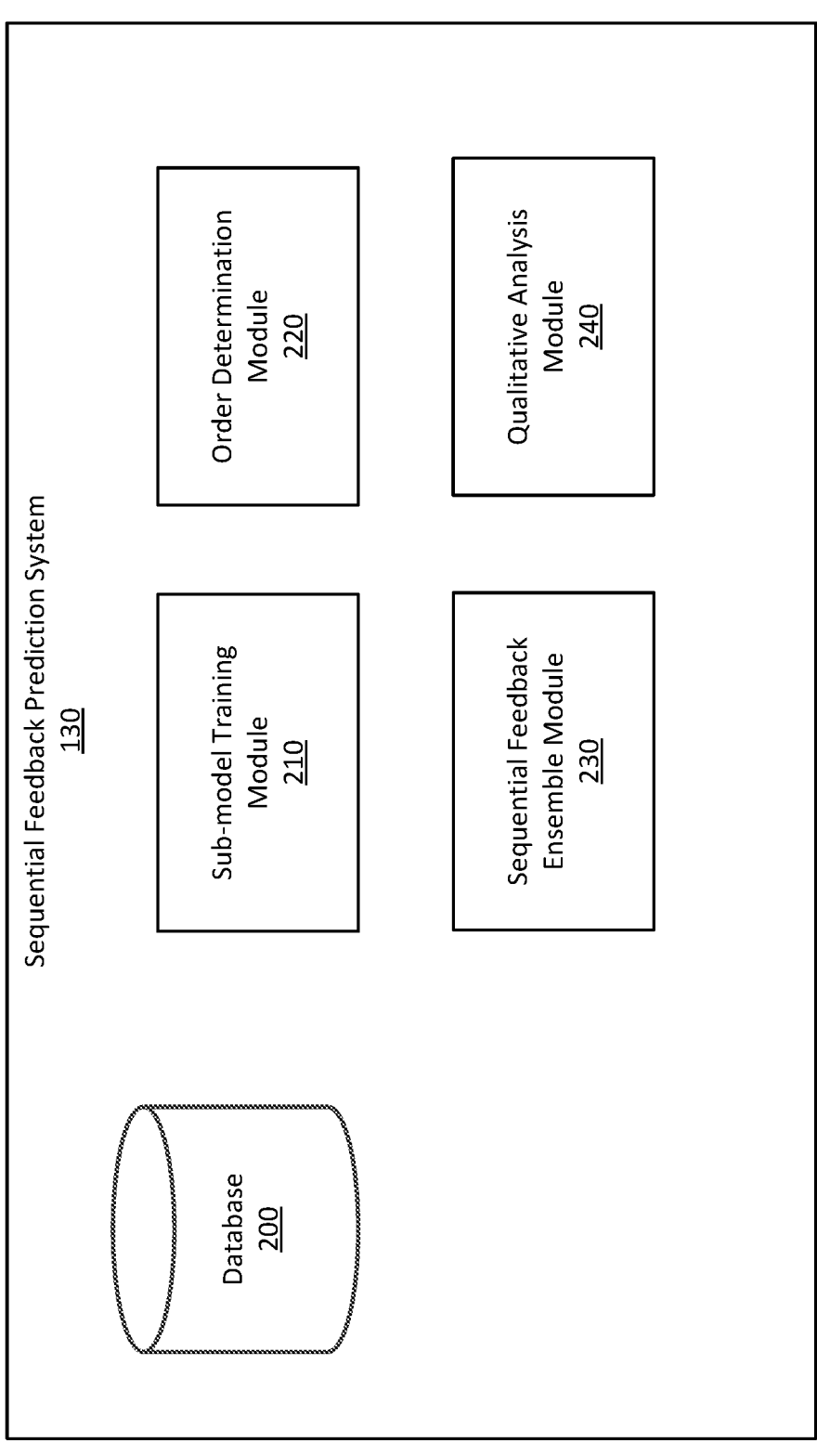
FIG. 2 illustrates an exemplary embodiment of modules in a sequential feedback prediction system, according to one embodiment.

FIG. 2 illustrates an exemplary embodiment of modules in the sequential feedback prediction system 130, according to one embodiment. The sequential feedback prediction system 130 may include a database 200 for storing data, a sub-model training module 210 that trains individual sub-models for predicting each outcome, an order determination module 220 that determines an order for assembling sub-models, a sequential feedback ensemble module 230 that determines an architecture for an sequential feedback ensemble model, and a qualitative analysis module 240 that generates semantic risk analysis and a comprehensive risk profile.

The database 200 may store information received from client devices 116 and trained sub-models for predicting risks. In one embodiment, the database 200 may store data collected such as risk factors, medical history, or any data useful for training the model. For example, in the context for predicting high-risk pregnancy, the risk factors may include hypertension, diabetes, substance abuse, etc. The database 200 may further store trained sub-models for predicting individual outcomes. For example, the database 200 may store a set of trained parameters for each sub-model that predicts a possibility of a particular outcome. The stored sub-models are used as building blocks for the sequential feedback ensemble model as descried in further details in accordance with sequential feedback ensemble module 230.

The sub-model training module 210 trains individual sub-models for predicting each outcome. Each sub-model may predict a possibility that a particular outcome may occur. In one embodiment, the sub-model training module 210 may train each sub-model using a distinctive set of training data. The sub-model training module 210 may extract a set of input feature vectors for each sub-model (such as using embedding). In one embodiment, each sub-model may use different sets of feature vectors as input, because different outcomes may be affected by different risk factors. For example, some conditions are more affected by generic factors, while other are more affected by social and environmental factors, and some others are affected by disease progression. In one embodiment, each sub-model may be a machine learning model or a statistical model. The sub-model training module 210 may train each sub-model and store a set of trained parameters along with the model to database 200. The trained models are used in later module.

The order determination module 220 determines an order for assembling sub-models. In one embodiment, the order determination module 220 may determine an order based on performance of each sub-model. In one embodiment, the order is determined base on precision and/or recall, where precision (may also be referred to as positive predictive value) may be the fraction of relevant instances among the retrieved instances, whereas recall (also known as sensitivity) may be the fraction of relevant instances that were retrieved. The order determination module 220 may determine to select a sub-model as the next model based on its performance. For example, the order determination module 220 may select a sub-model as a first sub-model for the ensemble model based on precisions of prediction results of a set of potential sub-models. In one embodiment, the order determination module 220 may run each sub-model and select the one with the best precision as the first sub-model. The order determination module 220 may then use the predicted results from the first sub-model as an input for the rest of the sub-models in addition to the input features for each sub-model. The order determination module 220 may select from the rest of the sub-models, a second sub-model with the best predicted results as the second sub-model. Similarly, to select a third model, the order determination module 220 may use the predicted scores from the first and second sub-models as input to the rest of the sub-models in addition to each sub-model's input features and select a sub-model with the best predicted results as a third sub-model. To illustrate the above process, FIG. 3 depicts an order determination process for an ensemble model with four sub-models.

Figure 3:
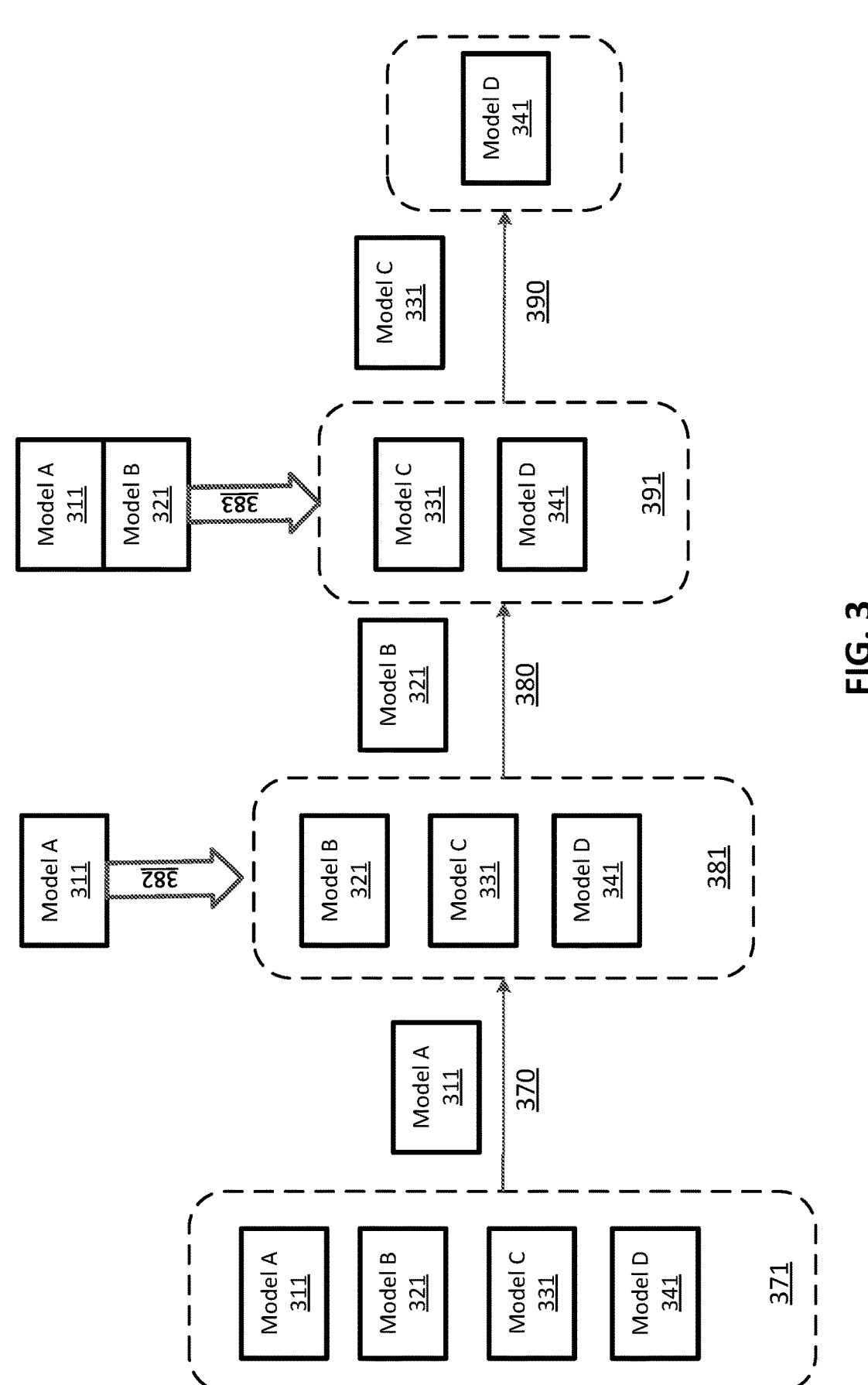
FIG. 3 illustrates an exemplary embodiment of an order-determination process, according to one embodiment.

FIG. 3 illustrates an order determination process for four sub-models Model A 311, Model B 321, Model C 331, and Model D 341. The order determination module 220 may start 371 with first running each model using a set of input feature vectors corresponding to each sub-model. Each sub-model may generate a set of predicted scores/outputs. The order determination module 220 may calculate a precision/recall score for the predicted results based on labeled outcomes, and the order determination module 220 may select 370 Model A 311 as a first sub-model responsive to Model A 311 generating a set of results with the best precision/recall. The order determination module 220 may then determine a second sub-model from the rest 381 of the sub-models. The order determination module 220 may run each of the rest 381 of the sub-models using outputs 382 from Model A 311 along with each sub-model's respective input feature vectors. The order determination module 220 may select 380 Model B 321 as a second sub-model based on outputs from each of the rest 381 of the sub-models, for example, responsive to Model B 321 generating results with the best precision. The order determination module 220 may then select a third sub-model from the rest 391 of the sub-models by running Model C 331 and Model D 341 using predicted scores 383 from Model A 311 and Model B 321 generated from steps 370 and 380. Responsive to Model C generating predicted results with the best precision, the order determination module 220 may select 390 Model C 331 as a third sub-model. At last, the order determination module 220 may determine that Model D 341 as the fourth sub-model. The process illustrated in FIG. 3 only depicts an order determination process for an ensemble model with four sub-models, while the same process can be applied to an ensemble model with any number of sub-models. The exemplary process uses precision/recall as a parameter for selecting a sub-model from a set of sub-models, but any other parameters that can indicate model performance can be used as the selecting criteria (e.g., confidence score, precision, recall, confusion matrix, lift chart, mean squared error, log loss, etc.)

The sequential feedback ensemble module 230 determines an architecture for a sequential feedback ensemble model based on the order determined by the order determination module 220. The sequential feedback ensemble module 230 may construct a pipeline for the sequential feedback ensemble model using sub-models as building blocks. Greater details associated with the sequential feedback ensemble module 230 are discussed in accordance with the exemplary embodiment depicted in FIG. 4.

Figure 4:
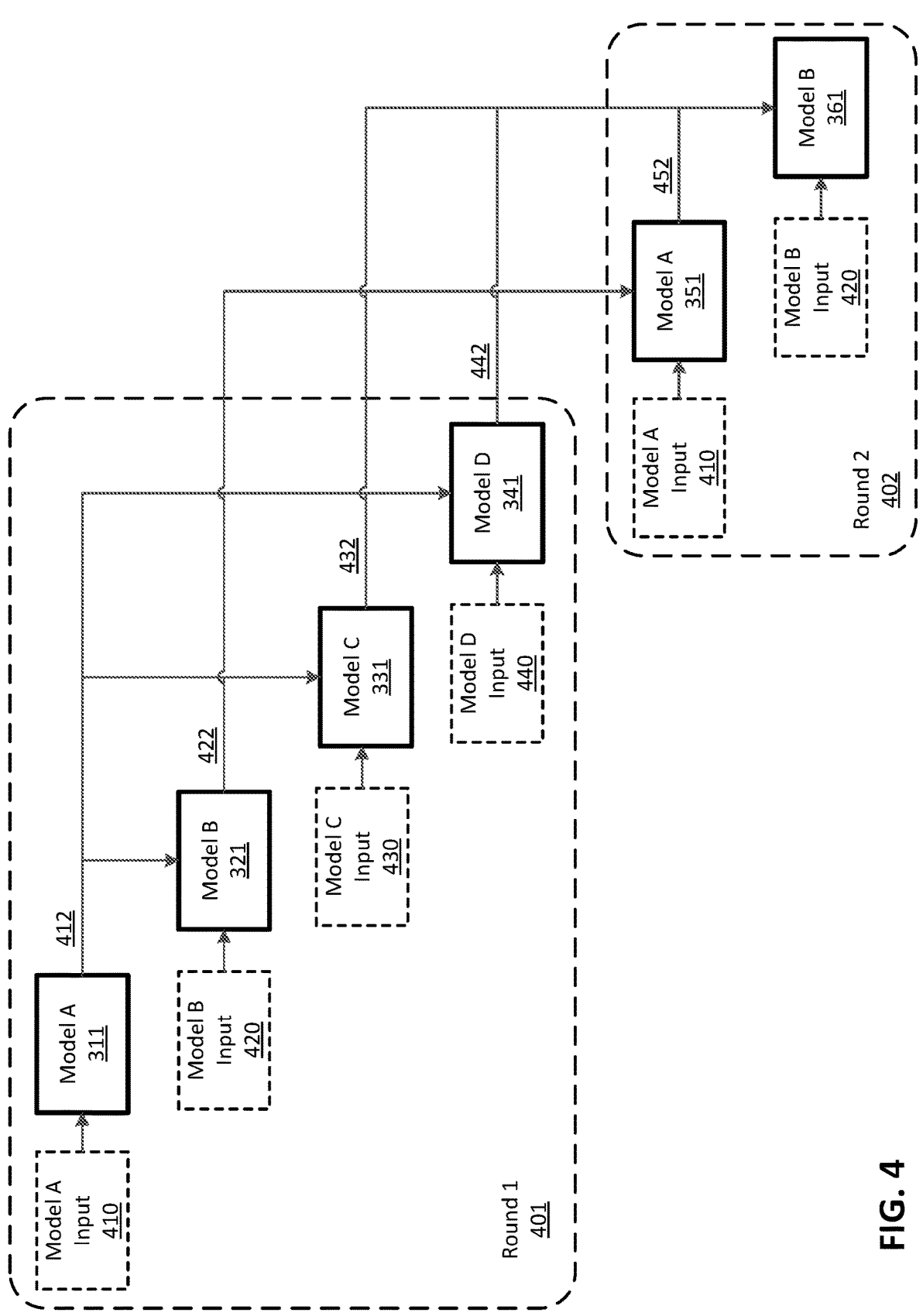
FIG. 4 illustrates an exemplary embodiment of an ensemble model with four potential outcomes, according to one embodiment.

FIG. 4 illustrates an exemplary embodiment of an ensemble model with four potential outcomes, according to one embodiment. The ensemble model in FIG. 4 may include four sub-models, such as Model A 311, Model B 321, Model C 331, and Model D 341. Each sub-model may predict a risk associated with a specific outcome associated with an event. For example, the ensemble model may be constructed to predict whether a patient is associated with high-risk pregnancy. A patient with high risk pregnancy may be associated various outcomes, such as preterm delivery, NAS (Neonatal Abstinence Syndrome), NICU (Neonatal Intensive Care Unit), and primary C-section. For illustration purposes and as an example, Model A 311 may be trained to predict a risk associated with preterm delivery, Model B 321 may be trained to predict a risk associated with NAS, Model C 331 may be trained to predict a risk associated with NICU, and Model D 341 may be trained to predict a risk associated with primary C-section. In one embodiment, the order of Models A-D 311-341 is determined by the order determination module 220. The sequential feedback ensemble module 230 may receive from the order determination module 220 that the order for Model A-D 311-341 is Model A→Model B→Model C→Model D.

In one embodiment, the sequential feedback ensemble module 230 may determine a number of rounds to run the sub-models. In the exemplary embodiment illustrated in FIG. 4, the sequential feedback ensemble module 230 may determine to run two rounds including round 1 401 and round 2 402. In round 1 401, the sequential feedback ensemble module 230 may first run Model A 311 using a set of input features 410 for Model A. For example, suppose that Model A predicts risk scores associated with preterm delivery, the set of input features 410 for Model A may be a set of factors specific to predicting preterm delivery. Model A may generate predicted results 412 that include a predicted risk score for each patient. The sequential feedback ensemble module 230 may then run Model B 321, where the inputs for Model B 321 include Model B input 420 (e.g., a set of input features specific to Model B), and predicted results from Model A 412. In one embodiment, the sequential feedback ensemble module 230 may aggregate the predicted results from Model A 412 into the Model B input 420, such as by aggregating an additional entry including predicted risk scores from Model A into the set of input vectors for Model B. Model B 321 may generate a set of predicted results 422. For example, Model B 321 may generate a set of predicted scores indicating risk associated with NAS. The sequential feedback ensemble module 230 may then run Model C 331, where the inputs for Model C 331 may include Model C input 430, predicted results 412 generated by Model A 311, and predicted results 422 generated by Model B 322. Similarly, the sequential feedback ensemble module 230 may run Model D 341 using inputs including Model D input 440, predicted results 412 generated by Model A, predicted results 422 generated by Model B 422, and predicted results 432 generated by Model C.

In one embodiment, the sequential feedback ensemble module 230 may determine to use the predicted results 412, 422, 432, and 442 as final outputs for the ensemble model. In another embodiment, the sequential feedback ensemble module 230 may determine to construct a round 2 402, or multiple additional rounds to further refine the results. For round 2 402, the sequential feedback ensemble module 230 may run a second round of Model A 351 using Model A input 410 and predicted results generated by other submodels. For example, the second round of Model A 351 may use predicted results 422, 432, 442 generated by Model B 321, Model C 331, and Model D 341, in addition to Model A input 410. The second-round Model A 351 may generate predicted results 452, and comparing to predicted results 412 generated by first-round Model A 311, the predicted results 452 take into account information generated by first round Models B, C, and D. The sequential feedback ensemble module 230 may run a second-round Model B 361 using predicted results 432, 442, and 452, generated by first-round Models B-C, and second-round Model A. In the embodiment illustrated in FIG. 4, the ensemble model may output a set of final predicted results using outputs from first-round Model C 331, Model D 341, second-round Model A 351, and Model B 361. In one embodiment, the sequential feedback ensemble module 230 may determine a number of rounds (e.g., automatically based on performance of predicted results or manually determined by a human) to run for each sub-model for the ensemble model. In one embodiment, the sequential feedback ensemble module 230 may automatically determine to stop executing additional rounds of the sub-models responsive to the performance (e.g., model metrics such as precision/recall, etc.) meeting a target goal. Alternatively, the sequential feedback ensemble module 230 may automatically determine to stop executing additional rounds of the sub-models responsive to improvement between consecutive rounds of execution being smaller than a predetermined threshold. For example, responsive to the difference between the N-th round results of Model A and the (N+1)-th round of results of Model A being smaller than a pre-determined threshold, the sequential feedback ensemble module 230 may automatically determine to executing and additional rounds of iterations and may output the set of results from the latest sub-models as outputted predictions.

Referring back to FIG. 2 and continuing with the discussion, the qualitative analysis module 240 generates semantic risk analysis and a comprehensive risk profile. The qualitative analysis module 240 may apply any known NLP (natural language process) models to perform analysis on any textual data (e.g., medical history, symptoms of a patient). For example, the qualitative analysis module 240 may perform word embeddings on the textual information and transform the textual information into abstract vector representations. The qualitative analysis module 240 may, based on the vector embeddings and corresponding labels (e.g., whether a patient is observed with certain outcomes), train machine learning models that predict risks associated with a patient given a set of textual data. The predicted results generated by the qualitative analysis module 240 may be consolidated with the results generated by the sequential feedback ensemble module 230 into a risk profile for a patient. In addition to the qualitative analysis, quantitative analysis of member level risk factors that drive a prediction and data visualization can provide a comprehensive risk profile.

FIG. 5 illustrates an exemplary training process for a sequential feedback ensemble model, according to one embodiment. The process 500 starts with the sequential feedback prediction system 130 receiving a set of training data that include data records for a plurality of individuals, where each data record includes information associated with a set of risk factors and each data record is labeled with an outcome of a set of outcomes having inherent sequential dependencies correlated with each other. The sequential feedback prediction system 130 may train 504 a set of sub-models for the set of outcomes. In specific, the sub-model training module 210 may train each sub-model to predict a risk associated with an outcome of the set of outcomes. The sub-model training module 210 may train each sub-model to predict risks for a respective outcome using a set of risk factors corresponding to the sub-model. The order determination module 220 may determine an order to assemble the sub-models. The sequential feedback ensemble module 230 may determine 506, for each sub-model, a subset of the set of sub-models, where the predicted results generated by the subset of the set of sub-models are used as input for the respective sub-model, in addition to the set of input feature vectors for each sub-model. The sequential feedback ensemble module 230 may generate 508 a risk score for each of the set of outcomes based on the ensemble model, the risk score indicating a risk for an individual to be observed with the respective outcome.

FIG. 6 illustrates an exemplary prediction process using a sequential feedback ensemble model, according to one embodiment. The process 600 starts with the sequential feedback prediction system 130 receiving 602 a set of data associated with an individual including data related to a set of risk factors. The sub-model training module 210 may extract 604 a set of input feature vectors from the set of received data. The order determination module 220 may determine that a first sub-model is the first one in the sequence of sub-models to run. The sequential feedback ensemble module 230 may run the first sub-model and generate a first set of prediction results (e.g., may be referred to as first round results of the first sub-model.) The prediction results from the first sub-model may be used as input for subsequent sub-models. The sequential feedback ensemble module 230 may run multiple rounds of the queue of models and generate 608 additional rounds of prediction results for the first outcome based on the first sub-model using predicted results from other sub-models of the set of sub-models, wherein the additional rounds of prediction results for the first outcome take into account of prediction results of other sub-models of the set of sub-models. The sequential feedback ensemble module 230 may output 610 a set of prediction results of the additional rounds of prediction results as a final set of prediction results for the first outcome. Furthermore, member level quantitative and visualization methods provide a comprehensive risk profile.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method for training an ensemble model comprising:
   receiving a set of training data, the set of training data including a plurality of data records for a plurality of individuals, each data record including information associated with a set of risk factors, including risk factors for high risk pregnancy comprising hypertension, diabetes or substance abuse, and labeled outcomes for a set of outcomes, the set of outcomes including preterm delivery, neonatal abstinence syndrome, neonatal intensive care unit, and C-section, the set of outcomes having inherent sequential dependencies correlated with each other;

constructing an ensemble model comprising steps:

training a set of sub-models for the set of outcomes, each sub-model trained to predict a risk associated with an outcome of the set of outcomes, wherein each sub-model predicts risks for a respective outcome using a set of risk factors corresponding to the respective outcome;

for each sub-model, determining a subset of the set of sub-models, wherein results generated by the subset of the set of sub-models are used as input for the sub-model; and determining an order for connecting the set of sub-models, wherein each subsequent sub-model uses a set of corresponding risk factors for the sub-model and a set of predicted results from a previous sub-model as input;

constructing the ensemble model comprised of the trained set of sub-models and the order for connecting the trained set of sub-models, wherein the ensemble model is trained to generate a final prediction result or results by leveraging the results from the collection of prediction results of previous sub-models;

running the constructed ensemble model for a particular patient to predict the likelihood the particular patient will have a pregnancy with preterm delivery, neonatal abstinence syndrome, neonatal intensive care unit, or C-section; and outputting the predicted likelihood the particular patient will have a pregnancy with preterm delivery, neonatal abstinence syndrome, neonatal intensive care unit, or C-section.

2. The method of claim 1, wherein the order is determined based on precision or recall of the predicted results of the set of sub-models.

3. The method of claim 1, further comprising:

determining risks associated with the set of outcomes by training a Natural Language Process (NLP) model based on a set of textual training data;

consolidating the risks associated with the set of outcomes from the NLP model with the predicted likelihood the particular patient will have a pregnancy with preterm delivery, neonatal abstinence syndrome, neonatal intensive care unit, or C-section;

generating a risk profile based on the predicted likelihood the particular patient will have a pregnancy with preterm delivery, neonatal abstinence syndrome, neonatal intensive care unit, or C-section predicted by the ensemble model and the risks determined by the NLP model that leverages both qualitative and quantitative analysis.

4. The method of claim 1, wherein each outcome of the set of outcomes is associated with a predetermined threshold, and responsive to a predicted risk score associated with an outcome exceeding the predetermine thresholds, predict that a respective individual will be associated with the outcome.

5. The method of claim 1, wherein the ensemble model constructs a second round of predictions for one or more sub-models of the set of sub-models.

6. The method of claim 5, wherein the ensemble model determines to stop including additional rounds of submodels responsive to a metric of the ensemble model achieving a predetermined performance goal.

7. A non-transitory computer-readable storage medium storing executable computer instructions that, when executed by one or more processors, cause the one or more processors to perform operations, the instructions comprising instructions to:

receive a set of training data, the set of training data including a plurality of data records for a plurality of individuals, each data record including information associated with a set of risk factors, including risk factors for high risk pregnancy comprising hypertension, diabetes or substance abuse, and labeled outcomes for a set of outcomes, the set of outcomes including preterm delivery, neonatal abstinence syndrome, neonatal intensive care unit, and C-section, the set of outcomes having inherent sequential dependencies correlated with each other;

construct an ensemble model by causing the one or more processors to:

train a set of sub-models for the set of outcomes, each sub-model trained to predict a risk associated with an outcome of the set of outcomes, wherein each sub-model predicts risks for a respective outcome using a set of risk factors corresponding to the respective outcome;

for each sub-model, determine a subset of the set of sub-models, wherein results generated by the subset of the set of sub-models are used as input for the sub-model;

determining an order for connecting the set of sub-models, wherein each subsequent sub-model uses a set of corresponding risk factors for the sub-model and a set of predicted results from a previous sub-model as input; and constructing the ensemble model comprised of the trained set of sub-models and the order for connecting the trained set of sub-models, wherein the ensemble model is trained to generate a final prediction result or results by leveraging the results from the collection of prediction results of previous sub-models;

running the constructed ensemble model for a particular patient to predict the likelihood the particular patient will have a pregnancy with preterm delivery, neonatal abstinence syndrome, neonatal intensive care unit, or C-section; and outputting the predicted likelihood the particular patient will have a pregnancy with preterm delivery, neonatal abstinence syndrome, neonatal intensive care unit, or C-section.

8. The non-transitory computer-readable storage medium of claim 7, wherein the order is determined based on precision or recall of the predicted results of the set of sub-models.

9. The non-transitory computer-readable storage medium of claim 7, wherein constructing an ensemble model further comprises:

determining risks associated with the set of outcomes by training a Natural Language Process (NLP) model based on a set of textual training data;

consolidating the risks associated with the set of outcomes from the NLP model with the predicted likelihood the particular patient will have a pregnancy with preterm delivery, neonatal abstinence syndrome, neonatal intensive care unit, or C-section;

generating a risk profile based on the predicted likelihood the particular patient will have a pregnancy with pre-term delivery, neonatal abstinence syndrome, neonatal intensive care unit, or C-section predicted by the ensemble model and the risks determined by the NLP model that leverages both qualitative and quantitative analysis.

10. The non-transitory computer-readable storage medium of claim 7, wherein each outcome of the set of outcomes is associated with a predetermined threshold, and responsive to a predicted risk score associated with an outcome exceeding the predetermine thresholds, predict that a respective individual will be associated with the outcome.

11. The non-transitory computer-readable storage medium of claim 7, wherein the ensemble model constructs a second round of predictions for one or more sub-models of the set of sub-models.

12. The non-transitory computer-readable storage medium of claim 11, wherein the ensemble model determines to stop including additional rounds of sub-models responsive to a metric of the ensemble model achieving a predetermined performance goal.

13. The method of claim 1, further comprising the steps of:

after constructing the ensemble model, generating, for an individual, a comprehensive risk profile by: (i) apply-ing an natural language process (NLP) model trained on textual data associated with the individual to deter-mine risks associated with the individual; (ii) consoli-dating the risks determined by the NLP model with risk scores generated by the ensemble model for the set of outcomes; and (iii) producing member-level quantita-tive explanations and visualizations that identify risk factors driving the predicted risks.

14. The non-transitory computer-readable storage medium of claim 7, having additional executable computer instructions that, when executed by the one or more proces-sors, cause the one or more processors to perform opera-tions, the instructions comprising instructions to:

after constructing the ensemble model, generating, for an individual, a comprehensive risk profile by: (i) apply-ing an natural language process (NLP) model trained on textual data associated with the individual to deter-mine risks associated with the individual; (ii) consoli-dating the risks determined by the NLP model with risk scores generated by the ensemble model for the set of outcomes; and (iii) producing member-level quantita-tive explanations and visualizations that identify risk factors driving the predicted risks.

* * * * *